United States Patent Office 2,698,292
Patented Dec. 28, 1954

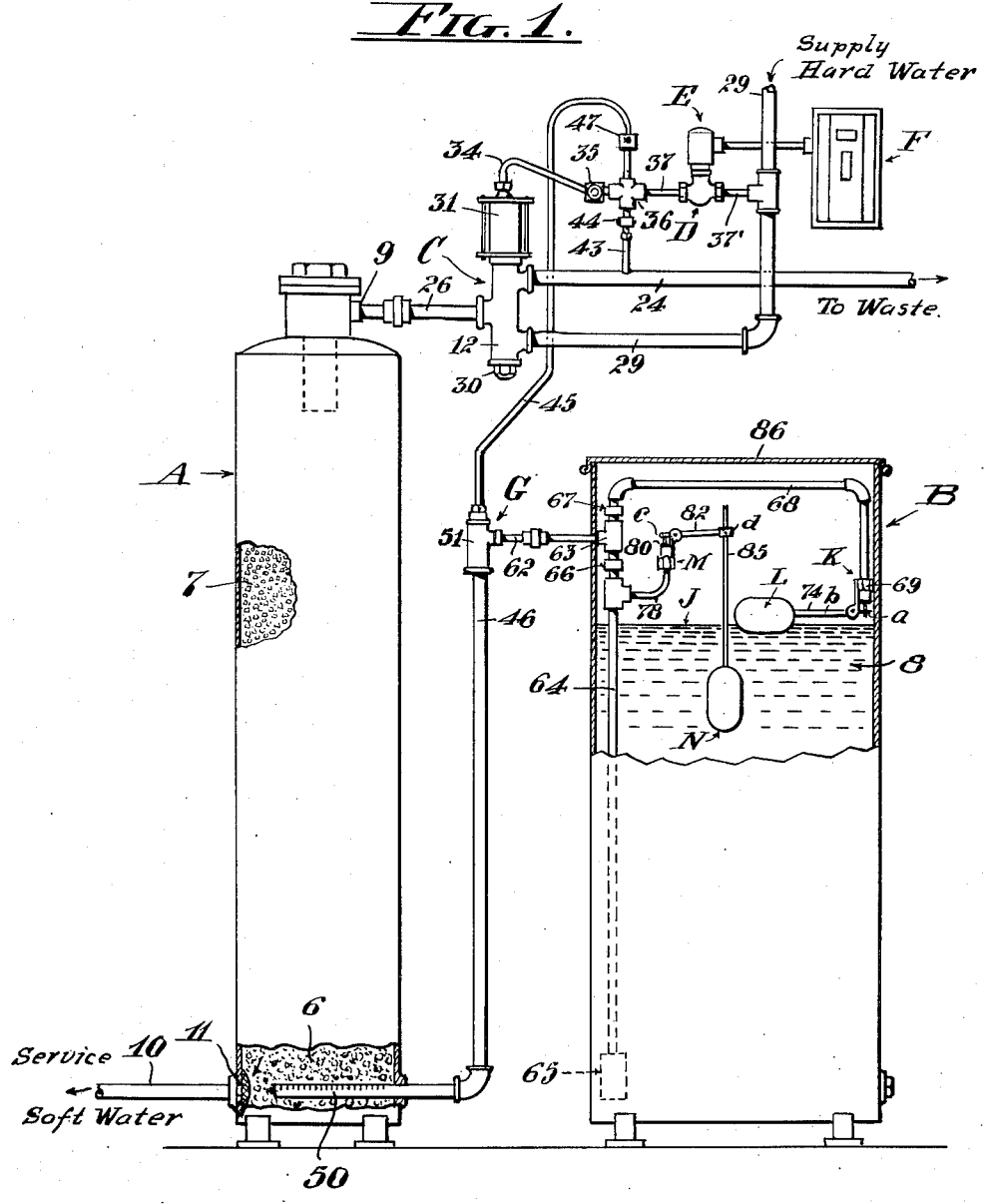

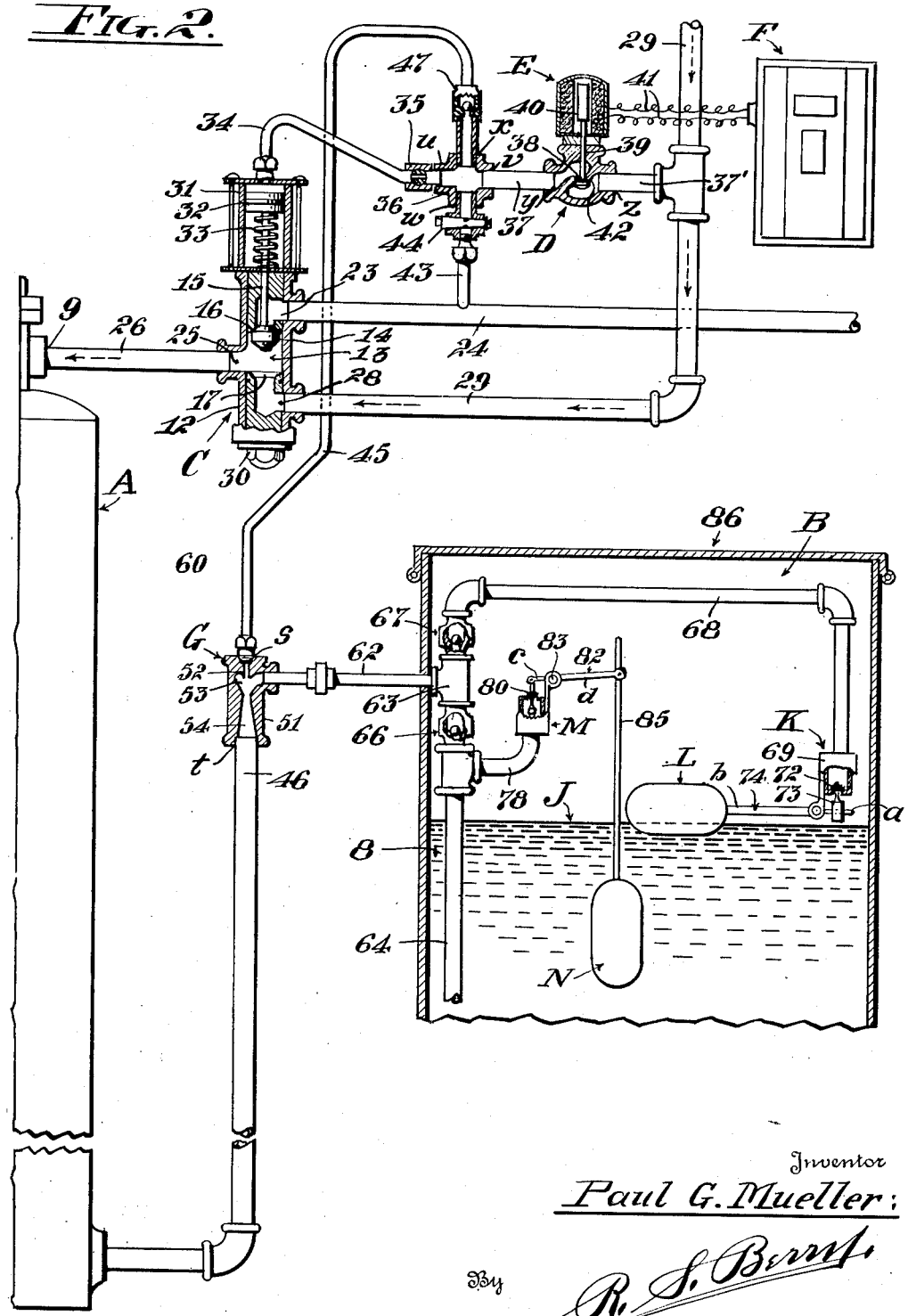

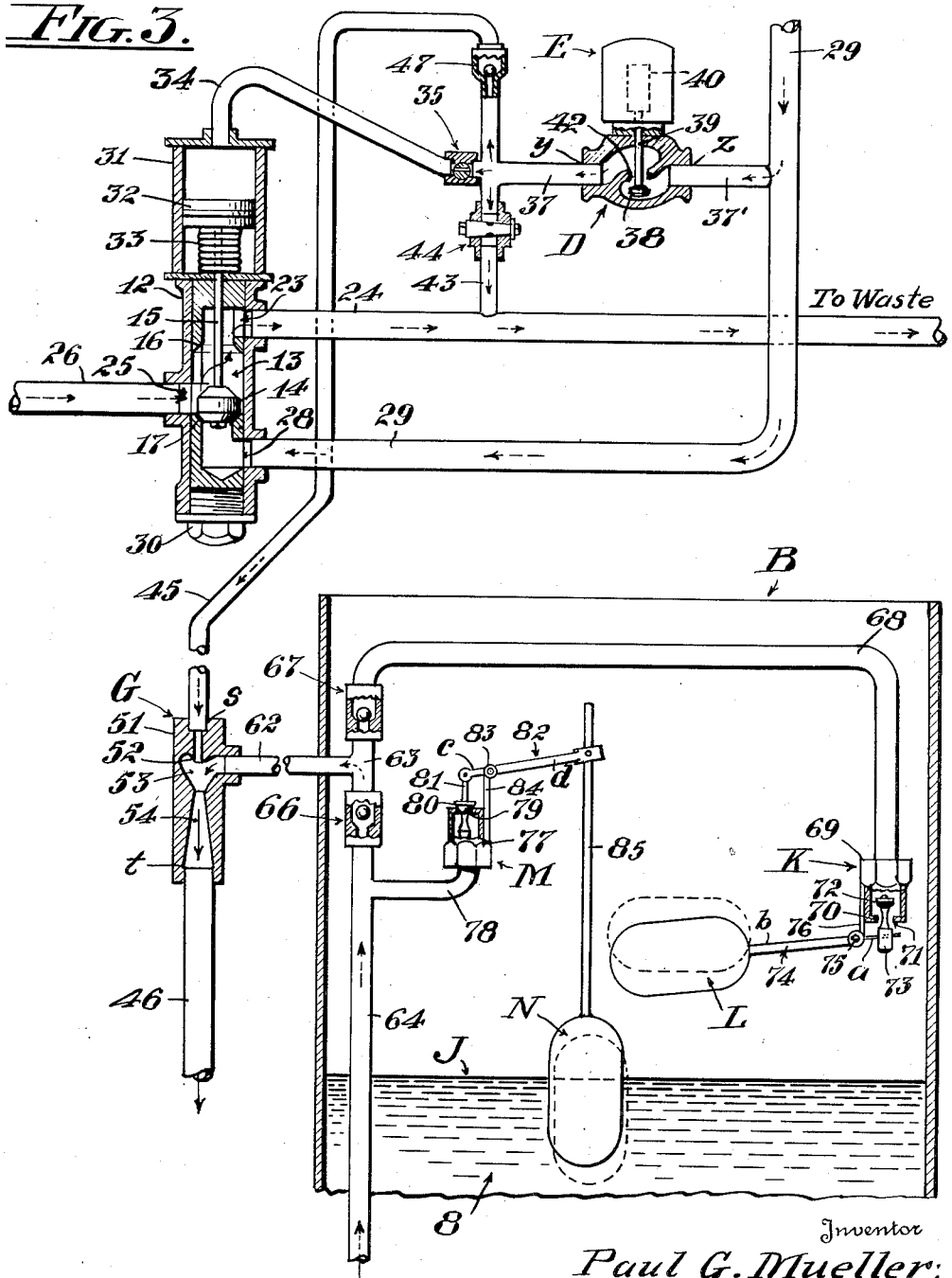

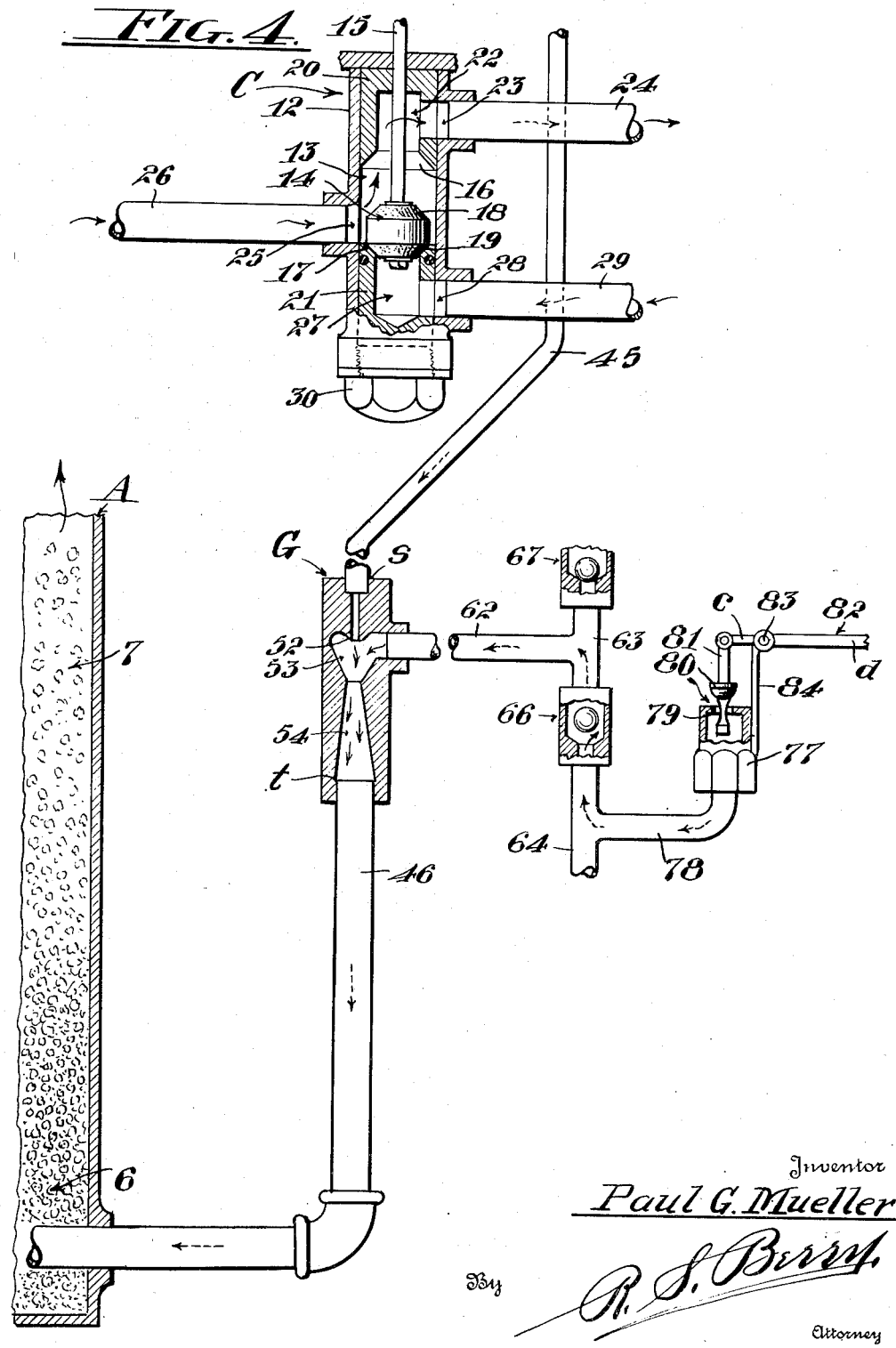

2,698,292

REGENERATION APPARATUS FOR DOWNFLOW WATER SOFTENERS

Paul G. Mueller, Los Angeles, Calif.

Application June 30, 1948, Serial No. 36,228

7 Claims. (Cl. 210—24)

This invention relates to regeneration apparatus for water softeners of the type in which zeolite or similar water softening mineral is regenerated from time to time by subjecting it to the action of brine.

The primary object of the invention is to provide a regenerating apparatus for water softeners of the down flow type embodying a zeolite containing water softening tank and a brine reservoir in which, in effecting the regenerating operation, brine is delivered to the lower end of the tank and caused to flow upwardly through the tank and through a granular mass of supporting material and the body of zeolite in such manner as to agitate the solids and thereby effect a washing action thereon with a rapid and thorough regeneration of the zeolite by the action of the salt content of the brine.

Another object is to provide a construction in the apparatus whereby backwashing of the tank, regeneration of the zeolite by the action of brine, and rinsing the brine from the tank will be effected in one combined and continuous operation.

Another object is to provide a means whereby air will be directed into the lower end of the softener tank together with rinsing water so as to pass upwardly through and effect agitation of the granules of softening material equivalent to a constant stirring action of the bed of granules and keeping the zeolite granules suspended and apart from each other during the rinsing operation thereby obtaining a rapid and thorough washing and regeneration of the zeolite as well as augmenting cleansing of the granules and the removal of sediment that may have accumulated on top of the bed of granules during the water softening operation.

It has been common practice to regenerate zeolite water softeners only after the zeolite is exhausted to the extent that water passing through it begins to show traces of hardness. It is also customary to back-wash down-flow softeners as a separate operation before introducing brine or salt solution into the softener and it has heretofore been considered necessary to back-wash at a comparatively high flow rate and then reduce the flow rate for salting and rinsing.

It is common knowledge that the greater the extent to which zeolite is exhausted, the greater is the quantity of salt required to regenerate it per unit of hardness that has been adsorbed. For instance, the salt required by a certain zeolite for complete regeneration is 50% for the first 70% of its capacity, the other 50% for the last 30% capacity. Another zeolite requires 55% for the first 80% and 45% for the last 20% of capacity. Approximately the same proportions are characteristic of all the zeolites. It is therefore obvious that regenerating at 70% to 80% of exhaustion is much more economical of salt than to allow the zeolite to become nearly exhausted.

It is well known that the softening action is much more rapid when the zeolite is fresh and that it gradually slows down until it stops completely when the zeolite is exhausted. Conversely, the speed of regeneration is very slow when the zeolite is exhausted and is practically instantaneous when it is only partially exhausted.

It has been found that the most economical method that is practical, is to regenerate the zeolite when it is about 75% exhausted. This not only reduces the amount of salt required but reduces the time required for regeneration and prolongs the useful life of the zeolite, which deteriorates rapidly when used to and beyond the point of exhaustion.

Due to the fact that regeneration is very rapid when the zeolite is only 75% exhausted and if the zeolite is stirred during the rinsing operation; a flow rate can be maintained that is not too high for salting and rinsing and is fully adequate for backwashing. Furthermore, when the salt solution is introduced under the zeolite bed and flows upwardly through it, the following rinse water does not push the salt solution ahead of it as in down salting and rinsing, but, due to the fact that the salt solution is considerably heavier than fresh water, the fresh water gradually dilutes it until no trace of salt is left. This permits the salt solution, gradually being diluted, to remain in contact with the zeolite much longer than if it were passed downwardly through the bed. It remains effective until it reaches a low degree of concentration. By introducing air with the rinse water at a relatively low flow rate the zeolite is held in suspension, permitting easy passage of the salt solution and rinse water, complete diffusion through the bed and exposing all the surfaces of the zeolite granules to the action of the salt solution.

In the present apparatus back-washing continues through the entire salting and rinsing cycles, and accordingly the separate operation of back-washing is eliminated and the time and water consumed in this operation as commonly practiced are saved.

Combining the back-washing with the salting and rinsing operations makes it possible to provide a simple and dependable apparatus for regenerating down-flow softeners which is inexpensive to manufacture and is readily adapted to automatic control.

Where automatic control is provided, timing of regeneration is regulated by a time switch which is set to start the regeneration at a convenient predetermined time before the zeolite is more than 75% exhausted. The salt solution is then introduced into the bottom of the softener tank and a top outlet of the tank is opened to waste permitting the salt solution to flow upwardly into the zeolite bed and from the upper end of the tank to waste. When a predetermined quantity of salt solution has been drawn from the brine tank, the flow of solution is stopped by opening a vacuum breaker. Air then admitted through the vacuum breaker takes the place of salt solution and the flow of water is automatically decreased thus reducing the flow during the subsequent rinsing operation and permitting the salt solution now in the softener tank to remain in contact with the zeolite longer than would be the case if the flow rate were higher. However, the air replacing the salt solution produces an effect equal to or greater than that of the higher flow rate of the salting operation.

Due to the fact that the back-washing continues through the entire rinsing operation the washing effect is more thorough than when done in the usual way prior to the salting operation.

The invention is carried into effect as illustrated by way of example in the accompanying drawing in which:

Fig. 1 is a view in side elevation with portions broken away of a down-flow water softener showing it as equipped with the regeneration apparatus showing the parts as positioned during the water softening operation;

Fig. 2 is a view in elevation with parts in section of the apparatus shown in Fig. 1 with the parts as disposed during the water softening operation;

Fig. 3 is a diagrammatic view of the regenerating apparatus showing the parts as disposed during the salting operation, and Fig. 4 is a diagrammatic view of a fragmentary portion of the regenerating apparatus with the parts as disposed during the rinsing operation.

Referring to the drawings more specifically A indicates a water softening tank containing in its lower portion a granular supporting material 6 and in its upper portion a conventional granular water softening mineral 7 consisting of zeolite, and B designates a reservoir containing a volume of brine or salt solution 8. The water softener tank A is here shown as comprising the downflow type fitted with a water intake 9 at the upper end thereof and with a discharge service pipe 10, shown in Fig.

1, leading from a screened outlet 11 adjacent the lower end thereof.

In carrying out the invention a control valve C is provided which is here shown as embodying a housing 12 containing a cylindrical passage 13 in which is mounted a valve element comprising a reciprocal valve piston 14 carried on a stem 15 projecting from the upper end of the housing. Opposed valve seats 16 and 17 are arranged in the passage 13 between which the valve piston 14 is adapted to travel. One end of the piston is provided with a cushion 18 arranged to cooperate with the valve seat 16 and the other end of the piston is fitted with a cushion 19 arranged to cooperate with the valve seat 17.

The valve seats 16 and 17 are formed respectively on plugs 20 and 21 snugly fitted in the end portions of the housing 12. The plug 20 is formed with a passage 22 which leads from the seat 16 in continuation of the passage 13 and opens laterally to an outlet passage 23 formed in the valve housing with which is connected a drain pipe 24 leading to waste at any suitable point of discharge. A passage 25 in the housing 12 opens laterally from the passage 13 adjacent the valve seat 17 with which is connected a conduit 26 leading to the inlet 9 at the upper end of the tank A. The plug 21 is formed with a passage 27 leading from the seat 17 in continuation of the passage 13 and opening laterally to an inlet passage 28 in the valve housing with which is connected a conduit 29 leading from any suitable source of hard water supply. The passage 25 thus leads from between the seats 16 and 17 while the seats 16 and 17 lie between the passage 25 and the passages 23 and 28 respectively. The plug 21 is removable to give access to the interior of the valve housing and to permit removal and replacement of the piston 14. A screw cap 30 is threaded into the lower end of housing 12 to hold the plug 21 in place.

The stem 15 of the piston 14 passes through the plug 20 and extends into a cylinder 31 where it connects with a piston 32 in the latter against which bears a spring 33 wound around the stem 15 and bearing on the bottom of the cylinder 31 whereby the piston 32 is normally maintained in an uppermost or outermost position so as to normally maintain the valve piston 14 in its closed position on the valve seat 16 as shown in Fig. 2 and thereby close communication between the upper end of the tank A and the drain pipe 24 through the conduit 26 and normally maintain communication between the water supply pipe 29 and the upper end portion of the tank A through the conduit 26.

The piston 32 is designed to be operated by hydraulic pressure in opposition to the spring 33 to move the valve piston 14 off the seat 16 and onto the seat 17 as shown in Fig. 3 so as to close communication between the water supply pipe 29 and the upper end portion of the tank A and open such end portion to the drain pipe 24.

This hydraulic operation of the control valve C is controlled by a normally closed cut-off valve D by which water under pressure may be directed when required from the water supply pipe 29 to the cylinder 31; the conduit 34 leading from the outer end of the cylinder 31 and connecting with a manifold 36, here shown as a cross-coupling, having a plurality of ports $u$, $v$, $w$ and $x$; the conduit 34 connecting with the port $u$, while another port $v$ is connected to the outlet $y$ of the valve D as through a pipe 37 and the inlet $z$ of which the valve is connected to the water supply pipe 29 through a pipe 37′.

The valve D embodies a valve element 38 on a stem 39 which is here shown as electrically controlled; the stem 39 being connected with a core 40 of a solenoid magnet E provided for the purpose of effecting automatic timed control of the apparatus; the terminals of the magnet E being connected to conductors 41 leading to a conventional time switch F. It is manifest, however, that the valve D may be operated manually in the conventional fashion. The valve element 38 is normally disposed in a closed position against a seat 42 interposed between the valve inlet $z$ and outlet G as shown in Fig. 2 by water pressure imposed on the element.

Leading from port $w$ of the manifold 36 and connecting with the drain pipe 24 is a pipe 43 fitted with a regulating valve 44 which serves to restrict the flow of water through the pipe 43 to waste on opening the valve D such that sufficient pressure is maintained in the line afforded by the conduit 34 to force the control valve piston 14 to its lower position on the seat 17 and hold it there during such time as the valve D is open as shown in Fig. 3. The pipe 43 also serves as a bleeder line for the housing 31 through the conduit 34.

Leading from port $x$ of the manifold 36 and thus from the water supply pipe 29 through the valve D is a conduit 45 connecting through an injector G with a conduit 46 leading into thte lower end of the tank A and terminating in a distributor 50 through which discharge of liquid from the conduit 46 upwardly into the tank is effected. A check valve 47 is provided in the conduit 45 opening toward the injector to prevent water from backing up from the injector. The injector G embodies a housing 51 formed at one end with an inlet $s$ with which the conduit 45 connects and is formed at its other end with an outlet $t$ from which the conduit 46 leads; the housing embracing a nozzle 52 the intake end of which connects with the conduit 45 through the inlet $s$ and the discharge end of which opens to a chamber 53 in the housing 51 from which leads a diverging passage 54 opening at its reduced end directly opposite the nozzle 52 and connecting at its large end with the conduit 46 through the outlet $t$.

A delivery pipe 62 leads laterally from the injector chamber 53 and connects with a T-coupling 63 within the reservoir B from which discharge pipe 64 leads downwardly into the reservoir B and opens at its lower end adjacent the bottom of the reservoir through a screen 65; the pipe 64 being fitted with an upwardly opening check valve 66 at its upper end and adjacent the coupling 63 to prevent back flow of water into reservoir B through the conduit 64.

Connecting with the coupling 63 through an upwardly opening check valve 67 is a water delivery pipe 68 which leads to a float controlled valve K embodying a housing 69 formed with a valve seat 70 surrounding an opening 71 in the bottom of the valve housing 69 leading to the reservoir B, and an upwardly opening cut-off valve 72 arranged to close on the seat 70, which valve is fitted with a downwardly extending stem 73 leading through the opening 71. A lever 74 pivoted at 75 on a hanger 76 carried by the valve housing 69 has a short arm $a$ connected to the valve stem 73 and a long arm $b$ fitted with a float L arranged to be elevated by raising of the level J of the brine or the salt solution 8 in the reservoir B to effect closing of the valve 72 when a predetermined level of the solution is reached.

A vacuum breaking float controlled valve M is arranged in the reservoir B which embodies a hollow housing 77 the interior of which connects through tubing 78 with the pipe 64 immediately below the check valve 66. The interior of the valve housing 77 opens upwardly into the upper portion of the reservoir B above the level J of the brine or salt solution 8 through a valve seat 79. An upwardly opening valve 80 is adapted to engage the valve seat 79 and is fitted with a stem 81 pivotally connecting with the short arm $c$ of a lever 82 pivoted at 83 on a bracket 84 carried by the valve housing 77 and which lever embodies a long arm $d$ carrying a dependent rod 85 fitted with a float N whereby the valve 80 is maintained closed until the level J of the brine 8 in the reservoir B falls to a point sufficiently to permit the float N to move downwardly and effect opening of the valve 80 as shown in Fig. 4.

The reservoir B is provided with a removable closure 86 on removing of which salt or strong brine may be delivered to the reservoir as occasion may require to maintain the salt solution 8 at suitable strength.

In the operation of the invention the piston 14 of the control valve C is normally disposed in its uppermost position shown in Fig. 2 so that water from the supply pipe 29 may flow under pressure through the valve chamber 13 and conduit 26 into the upper end portion of the tank A and thence be delivered downwardly through the tank and through the bed of zeolite 7 and granular supporting material 6 to discharge through the service pipe 10 on opening of some service outlet with which it connects. The water in flowing through the tank A is subjected to the softening action of the zeolite in the usual fashion during the period in which the zeolite is in its active condition.

The time switch F is set to start the regeneration cycle at a predetermined time so as to effect such regeneration when the zeolite is about 75% exhausted, which time has been previously ascertained by tests, and the switch is set to stop regeneration about forty-five minutes after starting. The time preferably employed for regeneration is between three and four o'clock a. m.

When the time switch reaches the time for which it is set it closes a switch in the conventional fashion so as to direct an electric current through the conductors 41 and through the coil of the solenoid magnet E to energize the latter and thereby cause the coil 40 to move under magnetic influence and thereby effect opening of the valve 38 by moving it from its seat 42. Water will then flow from the supply conduit 29 through the pipe 37′, valve D and pipe 37 into the manifold 36 from which a portion of the water passes to waste through the valve 44 and pipe 43 to waste pipe 24, while another portion flows through valve 35 and pipe 34 into the upper end of the cylinder 31 above the piston 32 so as to advance the latter in opposition to the spring 33 to cause the valve piston 14 to move from the seat 16 to its seated position on the seat 17 as shown in Fig. 4. The flow to waste through the valve 44 is regulated by the latter which is set to restrict the flow to a point at which sufficient pressure is maintained in the line ahead of the restriction to force the piston valve 14 to its lower position and to hold it there.

The supply of water to the upper end of the softener tank from the supply conduit 29 is then terminated and the upper end of the softener tank is opened to waste through the conduit 26, valve chamber 13 and the communicating passages leading to the pipe 24. Coincident with this operation of the control valve C water under pressure enters conduit 45 through check valve 47 from the manifold 36 and flows to the lower end of the tank A through the conduit 45, injector E, and conduit 46. The injector then becomes operative to draw salt solution 8 from the brine reservoir B through the pipe 64, valve 66, coupling 63, and pipe 62, then direct it downwardly through the conduit 46. The salt solution is thus forced into the lower end portion of the softener tank into the granular bed 6 from whence it flows upwardly in the tank A through the zeolite bed and passes out the upper end of the softener tank through the main control valve C to waste. The upwardly moving volume of brine followed by the rinse water, effects displacement of the fresh water originally contained in the tank A and forces it to discharge through the drain pipe 24. The brine in coming into contact with the zeolite effects regeneration thereof in the usual fashion.

When the level of the solution in the brine reservoir has been lowered to the point where the float N loses its buoyancy the float will move downwardly and thereby open the valve M thus allowing air to enter the pipe 64 through valve M and tubing 78 and stopping the flow of salt solution through the conduit 64.

When the flow of salt solution stops, fresh water continues to flow through the injector carrying entrapped air with it. The fresh water together with entrapped air flows into the softener tank and rises upwardly through the granular bed therein and gradually dilutes the salt solution that preceded it. The entrapped air and upward flow of water through the tank effects continuous gentle agitation of the zeolite granules so as to expose all their surfaces to the action of the salt solution thus insuring rapid and complete regeneration with a minimum of salt solution. This agitation also insures thorough removal of dirt and sediment from the zeolite; the granules in the tank A being lifted and moved about mainly by the air bubbles passing through the submerged bed so as to liberate any dirt and sediment deposited thereon or collected therebetween and thus permit its being picked up by the rinse water and carried to waste.

The flow of fresh water through the injector and the softening tank is continued until all traces of salt have been removed. The time required can readily be determined by a soap test, and the time switch is set so that the flow continues well beyond the minimum time required in order to allow a margin for safety.

At a predetermined time the time switch opens so as to cut-off electric current through the solenoid E, causing the valve D to close thereby relieving the pressure above the piston 31 so that the valve piston 14 will be restored to its position upon the seat 16 by the action of the spring 33; water above the piston 31 displaced by upward movement of the latter being discharged through the conduit 34, valves 35 and 44, and conduit 43 to the waste pipe 24. Water can now flow through the main control valve C into the upper end of the softener tank and downward through the zeolite for softening on opening an outlet of the service pipe 10. However, on closing the valve D and thereby cutting off the flow of water through the conduit 45 to the upper end of the injector, water will flow from the lower end of tank A through conduit 46 and through the injector in reverse and will flow through the conduit 62, valve 67, conduit 68, and the then open valve K into the brine reservoir until the brine level J for which the valve K has been set is restored. When this occurs the valve K will close under the action of the float L to cut-off the supply of water from the tank A to the tank B. In the meantime the valve M will be closed under the urge of the float N. The entire apparatus is then ready for its next regeneration cycle.

It will be noted that most of the water supplied to the brine tank in replenishing the brine used in the regenerating operation will be soft water by reason of its being passed through the freshly regenerated zeolite in the tank A.

While the above described operation has been applied to fully automatic regenerations it will be understood that semi-automatic operation can be obtained by the use of a hand set timer, and by controlling the valve D manually, the regeneration can be started and stopped at will.

The apparatus set forth is applicable for use in cleansing filters of various types and particularly filters employing sand or other granular material as a filtering medium, in which event the tank A is used as a filter and is charged with the filtering material, while the tank B is omitted. Fresh water is utilized in back washing and flushing the filtering material in tank A in the same manner as hereinbefore described in effecting a water softener regenerating operation with the exception that fresh water and air will be directed through the filtering material in the tank A instead of brine; the granules of filtering material being gently agitated by the upward flow of water and air bubbles therethrough so that any dirt that has accumulated in or on top of the filter bed will be freed and carried to waste by the rinse water.

I claim:

1. In a downflow water softener including a tank, a bed of water softening granules therein, and a brine reservoir; a conduit line leading from the lower portion of said reservoir to the lower portion of said tank, an injector in said line, means for delivering fresh water under pressure through said injector into the portion of the brine leading to the tank, a normally closed control valve embodied in said means, means for actuating said control valve, means for delivering a predetermined quantity of brine from said reservoir to said injector for delivery to said tank, float controlled means in said reservoir for admitting air to said injector after said predetermined volume of brine has been discharged from the reservoir to terminate the flow of brine to the injector; said injector then operating to draw air continuously into fresh water flowing therethrough and to direct the air into the lower portion of the tank.

2. In a down flow water softening apparatus of the character described, a tank containing a bed of granules, a conduit connected to the top portion of said tank, a two position control valve having a connection with said conduit, a hard water supply pipe connected to said valve, a drain pipe connected to said valve, said valve in one position connecting the conduit at the top of the tank to the water supply pipe and in the other position connecting it to the drain pipe, a cylinder, a piston in said cylinder connected to and for operating said valve, a spring actuating said piston to dispose the valve in the position connecting the conduit at the top of the tank to the water supply pipe, a second control valve having an inlet and an outlet, a pipe connecting said inlet to said water supply pipe, a manifold having a plurality of ports, a pipe connecting said outlet to one of the ports of said manifold, a conduit leading from another port of said manifold to the cylinder and opening on the side of said piston opposite said spring, a bleeder pipe leading from another port in said manifold connecting with said drain pipe, an injector having an inlet and an outlet, a conduit leading from another port in said manifold to the inlet of said injector, a conduit leading from the injector outlet to the lower end of said tank, a liquid reservoir, a delivery pipe leading from said injector, a discharge pipe leading downwardly into said reservoir having the lower end thereof opening adjacent the bottom of the reservoir, a connection between the upper end of said discharge pipe and said delivery pipe, an air inlet valve connected to the upper end of said discharge pipe, float mechanism controlling said air inlet valve, a water delivery pipe, a connection between said delivery pipes, a valve on the discharge end of said water delivery pipe, and float mechanism controlling said last named valve.

3. The apparatus called for in claim 2 together with time controlled means for operating the second control valve.

4. The apparatus called for in claim 2 together with a regulating valve in said bleeder pipe.

5. In a down flow water softening apparatus embodying a tank containing granular material and a liquid reservoir; a conduit leading from a source of water supply, a control valve having a passage with one end of which said conduit connects, a drain pipe leading from the other end of said passage, a conduit leading from said passage intermediate the ends thereof and connecting with one end of said tank, a valve element in said passage for alternately closing the passage to the water supply conduit and to the drain pipe, a means for actuating said valve element, a second control valve, means for delivering water from said water supply conduit through said second control valve to the other end of said tank, and means for continuously delivering air to said tank with water delivered thereto from said second control valve.

6. The structure called for in claim 5 together with means controlling the actuation of the first named control valve by operation of the second control valve.

7. In a down flow water softening apparatus embodying a tank containing granular material, and a liquid reservoir; a conduit leading from a source of water supply, a control valve having a passage with one end of which said conduit connects, a drain pipe leading from the other end of said passage, a conduit leading from said passage intermediate the ends thereof and connecting with one end of said tank, a valve element in said passage for alternately closing the passage to the water supply conduit and to the drain pipe, means for actuating said valve element, a second control valve, means for delivering water from said water supply conduit through said second control valve to the other end of said tank, and means for continuously delivering air to said tank with water delivered thereto from said second control valve, means for controlling the actuation of the first named control valve by operation of the second control valve and means for operating said second control valve at predetermined time intervals.

References Cited in the file of this patent

UNITED STATES PATENTS

| Number | Name | Date |
|---|---|---|
| 1,354,604 | Duggan | Oct. 5, 1920 |
| 1,749,622 | Yount | Mar. 4, 1930 |
| 1,789,314 | Lindsay | Jan. 20, 1931 |
| 1,905,726 | Lindsay | Apr. 25, 1933 |
| 1,962,663 | McGill | June 12, 1934 |
| 2,237,882 | Lawlor | Apr. 8, 1941 |